United States Patent
Portilho et al.

(10) Patent No.: US 8,034,130 B2
(45) Date of Patent: Oct. 11, 2011

(54) PROCESS FOR THE PRODUCTION OF BIODIESEL

(75) Inventors: Márcio de Figueiredo Portilho, Niteroi (BR); Edisson Morgado, Jr., Rio de Janeiro (BR); Marco Antonio Santos De Abreu, Rio de Janeiro (BR)

(73) Assignee: Petroleo Brasileiro S.A.-Petrobras, Rio de Janeiro, RJ (BR)

( * ) Notice: Subject to any disclaimer, the term of this patent is extended or adjusted under 35 U.S.C. 154(b) by 371 days.

(21) Appl. No.: 12/264,306

(22) Filed: Nov. 4, 2008

(65) Prior Publication Data
US 2009/0151234 A1    Jun. 18, 2009

(30) Foreign Application Priority Data
Dec. 13, 2007   (BR) .................................. 0705895-0

(51) Int. Cl.
  *C10L 1/19*   (2006.01)
  *C04B 35/465*  (2006.01)
(52) U.S. Cl. ............. 44/385; 44/308; 501/134; 501/135
(58) Field of Classification Search .................... 44/308, 44/385; 501/134, 135
See application file for complete search history.

(56) References Cited

U.S. PATENT DOCUMENTS

| 5,730,029 A | * | 3/1998 | Stoldt et al. ..................... 44/389 |
| 5,908,946 A | | 6/1999 | Stern et al. |
| 6,027,775 A | | 2/2000 | Kasuga et al. |
| 6,537,517 B1 | | 3/2003 | Kasuga et al. |
| 2007/0232818 A1 | * | 10/2007 | Crawford et al. ............. 554/174 |

FOREIGN PATENT DOCUMENTS
EP   0 832 847   4/1998

OTHER PUBLICATIONS

"Protonated Titanates and TiO2 Nanostructured Materials: Synthesis Properties and Applications" by Dmitry V. Bavykin, Jens M. Friedrich and Frank C. Walsh Adv. Matter 2006, 18 2807-2824.*

* cited by examiner

*Primary Examiner* — James Goloboy
*Assistant Examiner* — Pamela H Weiss
(74) *Attorney, Agent, or Firm* — Nixon & Vanderhye P.C.

(57) ABSTRACT

The present invention relates to a process for the production of alkyl esters of carboxylic acids for use as biodiesel starting from the reaction of transesterification of triglycerides originating from oils and fats of vegetable or animal origin, which can be used individually or in mixtures with one another in any proportions, employing heterogeneous catalysis by means of protonated lamellar titanate catalysts in nanostructured form, and said forms can comprise, among in other forms, nanotubes, nanofibres or nanosheets.

10 Claims, No Drawings

PROCESS FOR THE PRODUCTION OF BIODIESEL

FIELD OF THE INVENTION

The present invention relates to a process for the production of biodiesel by the transesterification of triglycerides using heterogeneous catalysts based on lamellar titanates. More specifically the present invention relates to a process for the production of biodiesel by the transesterification of triglycerides using catalysts of protonated lamellar titanates, obtained in nanostructured form.

BACKGROUND OF THE INVENTION

The mechanism of the conventional synthesis of biodiesel by means of the transesterification of triglycerides, for example from vegetable oils, promoted by liquid catalysts in an alkaline alcoholic medium (homogeneous catalysis), is relatively well known.

In heterogeneous catalysis, studies of biodiesel synthesis promoted by solid catalysts have revealed mechanisms that are more complex and poorly understood.

One of the findings illustrating this fact is that to date, no specific property of a solid catalyst, such as its acid or basic character, has been found that shows a more direct correlation with the performance of said catalysts in the reactions of biodiesel synthesis, and in view of this, a great many solid catalysts that are possible candidates have been mentioned for this purpose, though without further consideration regarding their crystalline and morphological structure, with the objective of increasing their catalytic efficiency, for use in biodiesel synthesis, as is the case with the present invention.

RELATED TECHNOLOGY

The transesterification of vegetable oils for the production of fatty acid esters is an ancient process with extensive industrial application.

During the 1980s and 1990s this process was adapted for producing fuel that is an alternative to diesel (BioDiesel) and at present the basic requirements of said processes are high purity and yield. The best results have only been achieved with ionic or nonionic homogeneous catalysts, the disadvantages of which are high cost of manufacture, difficulty in separating the catalysts from the reaction products obtained and in reusing the catalytic charge.

For many years, researchers throughout the world have been searching for an alternative to solid catalysts (heterogeneous catalysis) capable of performing transesterification reactions with the purity desired for the production of biodiesel, but so far without significant success, hence the only case that can be cited of an industrial process is ESTERFIP-H [Robert Stern, Gerard Hillion, Jean-Jaques Rouxel, Serge Leproq—Process for production of esters from vegetable oils or animal oils alcohols—U.S. Pat. No. 5,908,946 of Jun. 1, 1999 Institut Français du Pétrole (IFP)] which was commercialized by Axens, whose first process plant commenced production at the end of 2005, but the results obtained have not been impressive. Said process envisages a zinc aluminate as catalyst and temperatures in the range 175°C.-225° C., with pressures that can reach 60 kgf/cm$^2$, and it is justified economically by increased valorization of the glycerol obtained with higher purity than the glycerol resulting from the production of biodiesel by homogeneous catalysis.

Organic compounds based on titanium are known commercial catalysts for transesterification reactions and therefore solid inorganic catalysts based on titanium could be potential candidates for synthesis of biodiesel, even though a recently published study demonstrated that titanium dioxide (rutile) was not very effective for transesterification (Thesis of Alan Khan submitted to the Department of Chemical Engineering—University of Queensland—Brisbane, Queensland, Australia, on 18 Oct. 2002). On the other hand, lamellar titanates with compensating cations between the lamellar have never been tested for this application. Lamellar titanates of alkali metals and their derivatives can be synthesized in nanostructured form (e.g. nanotubes, nanofibres or nanostrips), offering advantages over the corresponding bulk materials, increasing their potential performance in various applications, in particular in the area of catalysts, bearing in mind their greater specific surface; however, the technology of structurization of inorganic oxides in said nanostructures is recent and is still under development.

Following a literature search, a method of hydrothermal synthesis of titania nanotubes was identified (KASUGA, T., et al., Langmuir 14 (1998) 3160; JP 10152323/EP 0832847 (1998), U.S. Pat. No. 6,027,775 (2000) and U.S. Pat. No. 6,537,517 (2003)), whose simplicity might permit simple industrial implementation. It was discovered in recent years that the materials synthesized by this technique are in fact alkaline titanates in lamellar form and nanostructured unidimensionally, which can easily be protonated by acid washing.

These formats for titanates were perceived to have great potential for the production of biodiesel by heterogeneous catalysis, and to date there is no method for using these types of catalytic structures for application in the transesterification of triglycerides for the production of biodiesel.

Accordingly, the application of catalysts in lamellar and/or nanostructured form satisfies the current need to obtain a high-yield catalyst for the production of biodiesel, that is impressive in its practical implementation, that can be recovered from the reaction beds and reused, with high specific surface, and of low cost.

SUMMARY OF THE INVENTION

A process is presented for the production of biodiesel, which uses a catalyst based on lamellar titanate, preferably of alkali metals or alkaline-earth metals, and very preferably of sodium, which undergoes subsequent protonation. Said catalyst is employed in the process of heterogeneous catalysis for production of esters of light alcohols starting from charges of triglycerides of vegetable or animal origin, which are used individually or mixed in any proportions. More particularly, the present invention relates to the application of said titanates in nanostructured form, as catalysts for the reaction of synthesis of biodiesel starting from charges of triglycerides of vegetable or animal origin, which can be said individually, or in mixtures in any proportions, in the presence of methanol or ethanol, in operating conditions of the reaction for obtaining biodiesel in the range from 65° C. to 290° C., more preferably in the range from 150° C. to 290° C., and under autogenous pressure of the system.

The lamellar titanate-based catalysts generated in nanostructured form for use in the present invention can also be prepared starting from metal compounds selected from the group comprising chlorides, nitrates, acetates, sulphates, carbonates, hydroxides and other precursors of transition metals and internal transition metals such as Mn, Fe, Co, Ti, Zr, Cu, Cr, Ni, Ru, Zn, Cd, Mo, W, V, La and Ce, besides the aforementioned alkali metals and alkaline-earth metals, such as Mg, Ca, and Ba, which can be introduced in the stage of synthesis of the lamellar titanate or can be exchanged ionically, partially or completely, starting from the precursor titanate in its alkaline or protonated form.

DETAILED DESCRIPTION OF THE INVENTION

It was discovered, unexpectedly, that in the case of the reaction of transesterification for the production of biodiesel, solid catalysts of the lamellar alkaline titanate type in nanostructured form that undergo protonation and/or exchange with other metal cations could be used directly as catalysts for biodiesel synthesis in a process of heterogeneous catalysis, since applications of said structures in commercial (or industrial) catalysts are not known for this purpose, and consultation of the literature did not reveal any application of said titanates in the lamellar or nanostructured forms as catalyst for use in the production of biodiesel in process of heterogeneous catalysis.

For the purposes of the present invention, the term "nanostructured" denotes structural forms that mainly are presented as nanotubes, and can also be in the form of nanorods, nanofibres, nanosheets, nanostrips, or other types of nanostructured forms.

In comparison with other solid catalysts such as aluminas, aluminosilicates, aluminophosphates, hydrotalcites and conventional $TiO_2$, the catalysts of the process of the present invention display significantly superior performance in conversion of triglycerides to biodiesel (monoalkyl ester).

Said catalysts in lamellar or nanostructured form are synthesized by methods known in the prior art, and they are used for catalysing transesterification reactions at high yield for production of biodiesel by means of heterogeneous catalysis, and combine amphoteric character, chemical stability, high specific surface, mesoporosity and relatively low cost.

The process of the present invention makes it possible to obtain esters of light alcohols starting from triglycerides of vegetable or animal origin, or in mixtures of these in any proportions, of high purity without the need for subsequent purification, as is usually carried out in plants for production of esters, as well as also producing glycerol with a high degree of purity.

Glycerol is a raw material for various industrial activities, and generally only achieves attractive selling prices when it is of a high degree of purity, which is usually obtained after intensive purification of the charge of raw glycerol in special units and by vacuum distillation.

The glycerol obtained at the end of the process of heterogeneous catalysis of the present invention possesses a slightly yellowish coloration due to contamination of vegetable oil, diglycerides and monoglycerides, biodiesel and residual alcohol. By simple evaporation of the alcohol, the glycerol is separated from the contaminants, in contrast to what happens with the glycerol obtained in processes of homogeneous catalysis, which is of a brown coloration due to the carry-over of beta-carotenes and other natural colouring matter from the vegetable oils, which reduces its commercial value.

Another advantage of the present process is that in heterogeneous catalysis it is possible for ethanol to be used instead of methanol, since in many countries methanol is an imported raw material whereas ethanol has the advantage that it is cheaper and is a raw material obtained from renewable sources.

Among the triglycerides of vegetable origin that can be used in the production of biodiesel using the process of the present invention, there are those oils and fats that can be selected from the group comprising preferably, but not limited to, palm oil, coconut oil, castor oil, canola oil, Brazilian palm oil, colza oil, sunflower oil, sesame oil, maize oil, soya oil, peanut oil, or linseed oil, as well as other plant species compatible for the production of biodiesel, and those that can be produced by genetic modification or by hybridization starting from the generally known natural sources, and provided that they are also compatible for the production of biodiesel.

Among the triglycerides of animal origin that can be used in the production of biodiesel using the process of the present invention, there are those oils and fats that can be selected from the group comprising preferably, but not limited to, fish oil, animal oils and fats, or lard, as well as those that can be produced by genetic modification or by hybridization starting from the generally known natural sources, and provided that they are also compatible for the production of biodiesel.

It is also possible to use triglycerides originating from the vegetable and animal sources as mentioned above, that have been used in cooking, and no longer possess the qualities for use in foods, therefore being unsuitable for these purposes, but that can be used as starting material for transesterification, such a oils used for cooking fried food.

These raw materials of vegetable or animal origin can be used individually, or can be used as mixtures of the aforementioned in any proportions, provided that the final mixture obtained is a raw material with characteristics compatible for use in the production of biodiesel.

Accordingly, one objective of the present invention is the application of said titanates in the form of lamellar or nanostructured structures, as catalysts for the reaction of synthesis of biodiesel starting from charges of triglycerides of vegetable or animal origin, which can be used individually, or in mixtures in any proportions, in the presence of methanol or ethanol, in operating conditions of the reaction for obtaining biodiesel in the range from 65° C. to 290° C., more preferably in the range from 150° C. to 290° C., and under autogenous pressure of the system.

PREFERRED DESCRIPTION OF THE INVENTION

The process for the production of biodiesel according to the present invention uses a catalyst based on a lamellar titanate, preferably of alkali metals, and very preferably of sodium, that undergoes subsequent protonation, and is preferably obtained in nanostructured form, and is employed in the process of heterogeneous catalysis for production of esters of light alcohols starting from charges of triglycerides of vegetable or animal origin, and are used individually or mixed in any proportions.

The catalysts based on lamellar titanate in nanostructured form for use in the present invention can also be prepared starting from metal compounds selected from the group comprising chlorides, nitrates, acetates, sulphates, carbonates, hydroxides and other precursors of transition metals and internal transition metals such as Mn, Fe, Co, Ti, Zr, Cu, Cr, Ni, Ru, Zn, Cd, Mo, W, V, La and Ce, as well as the aforementioned alkali metals and alkaline-earth metals, such as Mg, Ca, and Ba, which can be introduced in the stage of synthesis of the lamellar titanate or can be exchanged ionically, partially or completely, starting from the precursor titanate in its alkaline or protonated form.

The catalyst for use in the tests of the present invention was obtained at pilot-plant scale starting from hydrothermal treatment, in aqueous alkaline medium (NaOH 10M), of a crystalline titanium dioxide (anatase), at 120° C. for 15 to 30 hours, and the resultant suspension was filtered and the precipitate was washed abundantly with water and hydrochloric acid solution and then stove-dried at 120° C./16 h, obtaining the nanostructured catalyst of protonated titanate ($H_2Ti_3O_7$) in powder with average grain size of about 5 µm.

The nanotubes or nanorods produced, constituted of protonated sodium titanate (e.g. $Na_xH_{2-x}Ti_3O_7 \cdot nH_2O$), must have an external diameter preferably in the range from 5 nm to 50 nm, with BET specific surface in the range from 50 $m^2/g$ to 450 $m^2/g$, more preferably above 150 $m^2/g$.

For use in the present invention, the catalyst was pretreated at 300° C. in air for 2 hours and added in amounts in the range from 1% to 5% (w/w) relative to the triglyceride reactants used, the reaction mixture being heated at the reaction temperature for a period of 1 to 8 hours.

SPECIFIC EXAMPLES OF THE INVENTION

For the biodiesel synthesis experiments, titanate-based sodium catalysts were tested, which underwent acid washing for protonation, and were structured as nanotubes (TTNT=TiTanate NanoTubes), synthesized by the Kasuga method, achieving 100% conversion of the vegetable oil, of which 96.9% to methyl esters, as shown in the following examples.

The reactions were carried out in a 300-ml Parr reactor, under autogenous pressure of the system, with mechanical stirring at 500 rev/min and molar ratio of 1:30 of oil to alcohol.

The analyses presented were performed by carbon-13 nuclear magnetic resonance ($^{13}C$ NMR), and the reaction time and amount of catalyst are specified in each example.

The autogenous pressure of the system during the tests varied in the range from 25 $kgf/cm^2$ to 60 $kgf/cm^2$. The results presented verify the production of biodiesel (methyl or ethyl esters) at contents of about 97% and 100% conversion of the oil used, analysed by carbon-13 [nuclear] magnetic resonance ($^{13}C$ NMR).

The catalyst was separated by filtration of the reaction mixture, and the alcohol-glycerol mixture was separated from the biodiesel mixture by gravimetric decantation or centrifugation, and the alcohol was evaporated to obtain high-purity glycerol.

The biodiesel produced was washed with deionized water to remove residual alcohol and catalyst fines, and was then dried in a rotary evaporator to remove residual water, and was sent for analysis.

The analyses of metals by atomic absorption in the reaction products proved to be below the limit of detection for sodium and titanium, verifying catalysis in a heterogeneous medium.

Table 1 presents the results of tests for conversion of triglycerides to biodiesel starting from canola oil under three different sets of reaction conditions using catalyst of lamellar protonated titanate in the form of nanotubes/nanostrips with specific surface of 367 $m^2/g$ (300° C./2 h) and without using said catalyst. The conditions and the results obtained for the Examples given later, are summarized in the following table. Canola oil was chosen for carrying out the present tests, but a person skilled in the art will be aware that other compositions and mixtures of triglycerides originating from other sources can be employed.

TABLE 1

| Ex. | | Amount (g) | Methanol (g) | Catalyst (g) | Reaction conditions | Autogenous pressure ($kgf/cm^2$) | Degree of conversion (%) | | |
|---|---|---|---|---|---|---|---|---|---|
| | | | | | | | Methyl esters | Mono- and diglycer | Total |
| 1 | Canola oil | 100 | 50 | 1 | 225° C./2 h | 60 | 96.9 | 3.1 | 100 |
| | Reaction blank | 100 | 50 | | 225° C./2 h | 60 | 66.8 | 9.4 | 76.2 |
| 2 | Canola oil | 100 | 50 | 1 | 200° C./3 h | 40 | 68.9 | 13.7 | 82.6 |
| | Reaction blank | 100 | 50 | | 200° C./3 h | 40 | 40.5 | 4.5 | 45.0 |
| 3 | Canola oil | 100 | 50 | 1 | 175° C./8 h | 25 | 45.5 | 8.1 | 53.6 |
| | Reaction blank | 100 | 50 | | 175° C./8 h | 25 | 37.9 | 7.5 | 45.4 |

The operating conditions of each test are specified below.

Example 1

100 grams canola oil; 50 grams methanol; 1 g catalyst (protonated sodium titanate as powder with average grain size of approx. 5 µm).
Reaction conditions: 225° C./2 h in a single stage and under autogenous pressure (60 $kgf/cm^2$).
Degree of conversion: 100% of the canola oil, namely 96.9% to methyl esters and 3.1% to mono- and diglycerides.
Reaction blank: Conversion of 76.2% of the canola oil, namely 66.8% to methyl esters and 9.4% to mono- and diglycerides.

Example 2

100 grams canola oil; 50 grams methanol; 1 g catalyst (protonated sodium titanate as powder with average grain size of approx. 5 µm).
Reaction conditions: 200° C./3 h in a single stage and under autogenous pressure (40 $kgf/cm^2$).
Degree of conversion: 82.6% of the canola oil namely 68.9% to methyl esters and 13.7% to mono- and diglycerides.
Reaction blank: Conversion of 45% of the canola oil, namely 40.5% to methyl esters and 4.5% to mono- and diglycerides.

Example 3

100 grams canola oil; 50 grams methanol; 1 g catalyst (protonated sodium titanate as powder with average grain size of approx. 5 µm).
Reaction conditions: 175° C./8 h in a single stage and under autogenous pressure (25 $kgf/cm^2$).
Degree of conversion: 53.6% of the canola oil, namely 45.5% to methyl esters and 8.1% to mono- and diglycerides.
Reation blank: Conversion of 45.4% of the canol oil, namely 37.9% to methyl esters and 7.5% to mono- and diglycerides.

The results obtained showed that temperature and pressure play an important role in the degree of conversion of the triglycerides to biodiesel, as shown in Table 1.

On the other hand, the use of the catalyst in the format according to the present invention provided an impressive gain in rate of conversion over the "reaction blank". The test was carried out in the same manner and conditions as in the corresponding Examples mentioned, but without using the nanostructured lamellar titanate catalyst employed in the Examples, as shown in Table 1.

Independently of any other embodiments that can be implemented in the context of the present invention now presented, which represents a process for the production of biodiesel starting from the transesterification of triglycerides of vegetable or animal origin that can be used individually, or alternatively starting from a mixture of the aforementioned, in any proportions, the principal concept that guides the present invention is that of using heterogeneous catalysts based on lamellar titanates in nanostructured form, and is preserved with respect to its innovative conceptual character.

All the patent disclosures and others mentioned are incorporated here by reference in their entirety in the context presented of the present invention, and although the present invention has been described in its preferred embodiments by representative examples, these must not be regarded as limiting the scope of the present invention in any way, and a person skilled in the art will be able to envisage and implement variations, modifications, alterations, adaptations and equivalents conceivable and compatible with the working medium in question, taking as a basis the guidance presented here, though without deviating from the spirit and scope of the present invention, which are represented by the appended claims.

The invention claimed is:

1. Process for the production of biodiesel, wherein the method comprises producing biodiesel through heterogeneous catalysis by contacting triglycerides with catalysts based on lamellar titanates in nanostructured form, resulting in the transesterification of the triglycerides.

2. Process for the production of biodiesel according to claim 1, wherein the triglycerides comprise oils, fats of vegetable or animal origin, or mixtures thereof.

3. Process for the production of biodiesel according to claim 1, wherein the catalysts of lamellar titanates are produced starting from precursor compounds of alkali metals, alkaline-earth metals, transition and internal transition metals, which can be introduced in the stage of synthesis of the lamellar titanate or can be exchanged ionically, partially or completely, starting from precursor titanate in its alkaline or protonated form.

4. Process for the production of biodiesel according to claim 3, wherein the catalysts of lamellar titanates are preferably of alkali metals, more preferably of sodium.

5. Process for the production of biodiesel according to claim 4, wherein the catalysts of lamellar titanates are submitted to acid washing for their protonation.

6. Process for the production of biodiesel according to claim 1, wherein the catalysts of protonated lamellar titanates in nanostructured form used in said transesterification of triglycerides comprise nanotubes, nanorods, nanofibres or nanosheets, preferably being nanotubes with external diameter in the range from 5 nm to 50 nm and BET specific surface in the range from 50 $m^2/g$ to 450 $m^2/g$.

7. Process for the production of biodiesel according to claim 1, wherein a reaction temperature of said transesterification of triglycerides by means of said catalysts of protonated lamellar titanates in nanostructured form is in the range from 65° C. to 290° C.

8. Process for the production of biodiesel according to claim 1, wherein the catalysts of lamellar titanates in nanostructured form are used in said transesterification of triglycerides in amounts in the range from 1% to 5% (w/w) relative to said triglycerides.

9. Process for the production of biodiesel according to claim 1, wherein the catalysts of protonated lamellar titanates in nanostructured form used in said transesterification of triglycerides comprise nanotubes, nanorods, nanofibres or nanosheets, preferably being nanotubes with external diameter in the range from 5 nm to 50 nm and BET specific surface in the range from 150 $m^2/g$ to 450 $m^2/g$.

10. Process for the production of biodiesel according to claim 1, wherein a reaction temperature of said transesterification of triglycerides by means of said catalysts of protonated lamellar titanates in nanostructured form is in the range from 150° C. to 290° C.

* * * * *